Patented Nov. 15, 1927.

1,649,123

UNITED STATES PATENT OFFICE.

CARL S. MINER AND OTTO C. STANGER, OF CHICAGO, ILLINOIS, ASSIGNORS TO MOORMAN MFG. CO., OF QUINCY, ILLINOIS, A CORPORATION OF ILLINOIS.

ALIMENTARY PRODUCT.

No Drawing. Application filed September 13, 1924. Serial No. 737,577.

In the feeding of stock, particularly for the production of meat, it has been found necessary or desirable, in order to secure best results, that the customary vegetable feeds, such as admit of convenient storage and handling, be supplemented with certain mineral elements in which they are deficient. Such feeds have come to be known as mineral foods, being so designated in the classifications established by various governmental bureaus charged with the supervision and regulation of such commodities. They vary considerably as to constituents and ingredients, but a characteristic which is common to substantially all of them is their form, viz, that of a dry powder. Doubtless the preparation and marketing of the commodities in this form has resulted from the necessity of providing a homogeneous mixture of the various constituents, as well as the necessity for having them in a condition in which they can be readily swallowed by the animals.

While the pulverulent form of the material promotes uniformity in the mixture, it has long been recognized as possessing certain highly undesirable disadvantages. For example, when using materials of different specific gravities, there is a certain tendency for the pulverulent material to stratify when subjected to agitation such as that encountered in railway shipping. Also there is a certain percentage of loss incident to packaging, shipping and other handling, resulting from the sifting out of the pulverulent material through the bags or barrels in which it may be packaged. The greatest disadvantages are felt, however, incident to the use of the material. In the pulverulent form the material is difficult to feed to stock, due to its lack of bulk and its propensity for spreading, making it difficult for the animals to pick it up. Moreover it is subject to a very high percentage of waste. By carefully conducted experiment it has been found that of the pulverulent feed laid out for hogs, the proportion actually ingested by the animals amounted to less than eighty-five percent. That such is the case readily may be appreciated from consideration of the fact that the pulverulent food may be readily blown away by air currents, quickly washed away by rain, and otherwise scattered by adhering to the snouts, legs and other body surfaces of the animals. Indeed, considerable quantities are dissipated simply by the puffing and sneezing of the hogs while feeding. It will be recognized that due to these various factors, and others which might be mentioned, the annual loss in the preparation, handling and feeding of pulverulent feeds is very great, and an item of substantial economic importance.

The present invention has to do with the provision of a new article of manufacture in the nature of a composite mineral feed in granulated or mass or solid form, as distinguished from pulverulent form, and also a process for the production of such a product.

The general purpose of the invention is the provision of a new article of manufacture in the nature of a consolidated composite mineral feed homogeneous in constitution, susceptible of production in large quantities at low cost, easily handled in production and measuring for allotment to the animals, readily picked up by them in eating, readily susceptible of suitable reduction by mastication, and properly susceptible to the action of the digestive fluids.

Another object is the provision of such an article which will keep indefinitely, and which is not subject either to disintegration or agglomeration from different weather conditions.

A further object is the provision of a material of manufacture of the short specified in which any of the various desired mineral nutritive elements may be incorporated.

Other and further objects of the invention will be pointed out hereinafter, indicated in the appended claims, or obvious to one skilled in the art upon a full understanding of the present disclosure. For the purpose of making an adequate disclosure of the invention, we will describe one form of procedure for the practice of the process and production of the improved article of manufacture, and shall make reference to certain illustrative combinations of ingredients and certain instrumentalities for carrying on the process. It is to be understood that all of these are presented merely for illustrative purposes, as our improved article of manufacture may be constituted of a great variety of materials, not hereinafter specifically referred to, and its production may be accomplished by hand or by other instrumentalities.

In the carrying on of the process, the selected solid nutrient ingredients are first reduced to finely powdered form as uniformly as possible, and in that state are thoroughly and uniformly mixed. With these materials is admixed one susceptible of acting as a bonding agent in association with the others. Then, by suitable working and application of moisture the mixture is reduced to a plastic consistency, permitting its being formed into the desired mass units, and the bonding agent is so modified as to bring about a consolidation of the components.

For the bonding agent we prefer a quickly acting crystallogenic material, of which the partially dehydrated forms of gypsum, known generally under the name of plaster of Paris, are an example.

As a specific example of the constitution and process of production of such an article, we may take any convenient quantity of the following materials in the proportions designated, viz:

|  | Per cent. |
|---|---|
| Wood charcoal | 20 |
| Sulphur (either monoclinic or rhombic) | 5 |
| Rock phosphate, (such as cleaned Tennessee brown rock phosphate) | 25 |
| Limestone | 15 |
| Copperas | 10 |
| Glauber salt | 25 | said percentage proportions being on the basis of weight. These ingredients are reduced to finely divided form in any suitable manner and to as uniform a degree as possible, and then thoroughly mixed. In the mixture is included finely powdered plaster of Paris in a proportion ranging from 5 to 10 pounds for each 100 pounds of the other ingredients. This admixture of the pulverulent materials is made while they are dry. The mixture is then worked into a plastic mass by suitable rapid manipulation and the addition of water, the water being supplied in an amount slightly in excess of that required for the surface wetting of the material. When reduced to a plastic state, the mixture is immediately spread into thin sheets and scored, as by a roller or otherwise, for subdivision into pieces of the desired form. Or the plastic material may be moulded into the form of pellets, cakes or bars or sheets. This handling and forming is accomplished quickly, so that it may be completed before the hydration of the bonding material causes the mixture to set. The time required for setting depends to some degree, of course, upon the purity of the bonding material, its degree of dehydration, and other factors which may be controlled by selection of the material. A convenient setting period is from ten to twelve minutes after the addition of the water. Upon setting, the material retains the form given it with sufficient coherence to permit its being handled. After setting, the material is dried, either in a dryer or in the room atmosphere, same being capable of rapid completion, and the scored sheets or the other units then may be broken up into the desired subdivisions.

The resulting article is a composite mineral feed in consolidated form with a substantially uniform and homogeneous distribution of the several constituents throughout the consolidated units. In such form it is free of fine powder, and possesses a proper degree of hardness and cohesion to permit its being readily handled, packaged and transported without excessive disintegration. In such form it is of particular convenience in feeding to animals, as its bulk permits its being handled with ease and measured with accuracy, it is not easily scattered about and wasted in the feed receptacles, or blown away in the air, and is easily picked up by the animals. While the consolidated units are thus desirably resistant to disintegration, they are suitably friable to permit their being readily reduced by mastication and by the digestive fluids, so that they may be ingested by the animals in proper form for physiological use.

The nature and amount of the bonding material employed may be varied as desired in order to accord with the degree of hardness desired in the finished product, and the nature of the other ingredients of the mixture. In addition to the bonding action exercised by the bonding material in conjunction with the other constituents, the bonding material may be utilized to add some desired food element. For example, the use of gypsum, as above described, contributes lime, which is a desired element in foods of this character.

The product is not deleteriously affected by weather conditions, and does not exude any of its constituents, nor do the pieces become agglomerated when packed or heaped together. While retaining all of the recognized advantages of approved mineral foods, it is free of the disadvantages to which such foods heretofore have been subject, and contributes many further advantages of its own.

What we claim is:

1. A new article of manufacture, an aliment comprising comminuted mineral material retained in a friable coherent state by a bonding material consisting of calcium sulphate.

2. As a new article of manufacture, an aliment for animals, comprising comminuted mineral retained in a friable coherent state by a crystallogenic bonding material, same being reducible to pulverulent condition by mastication.

3. The art of preparing an alimentary article comprising reducing mineral material to pulverulent form, intermixing a bonding material therewith, and consolidating the mixture by crystallogenic action.

4. The art of producing an alimentary article comprising reducing nutrient minerals to pulverulent form, commingling the same with the addition of a bonding material, and setting the mixture in a consolidated state by crystallogenic action.

5. The art of producing an alimentary product comprising reducing nutrient minerals to pulverulent form, commingling them with the addition of a pulverulent plaster, adding moisture to form a plastic mass, shaping the mass, permitting it to set, and then subdividing it.

6. The art of forming an alimentary product comprising forming a plastic mixture of alimentary mineral with plaster and water, forming the mass into subdivisions and permitting the material to set.

7. The art of forming an alimentary product, comprising mixing food ingredients in powdered form with a bonding material, adding moisture to hydrate the bonding material and form a plastic mass, shaping the mass and then permitting the material to set.

In testimony whereof we have hereunto signed our names.

CARL S. MINER.
OTTO C. STANGER.